United States Patent [19]

Denman

[11] 4,115,609

[45] Sep. 19, 1978

[54] STRIP TYPE COUPLING MEMBER

[76] Inventor: Stephen A. Denman, 1216 Cloverfield Ave., Apt. (A), Dayton, Ohio 45429

[21] Appl. No.: 762,383

[22] Filed: Jan. 26, 1977

Related U.S. Application Data

[63] Continuation of Ser. No. 183,448, Sep. 24, 1971, abandoned.

[51] Int. Cl.$^2$ .............................................. B32B 1/04
[52] U.S. Cl. ...................... 428/68; 277/229; 428/36; 428/246; 428/343; 428/354; 428/355; 428/375; 428/457; 428/492
[58] Field of Search ...................... 428/36, 68, 71, 76, 428/343, 354, 355, 375, 457, 492; 277/229

[56] References Cited

U.S. PATENT DOCUMENTS

| | | | |
|---|---|---|---|
| 3,427,776 | 2/1969 | Lake et al. | 52/403 |
| 3,542,375 | 11/1970 | Renwick | 277/229 |

Primary Examiner—James J. Bell
Attorney, Agent, or Firm—Jerome P. Bloom

[57] ABSTRACT

A coupling device particularly advantageous for use in connecting parts of unlike material comprising a flexible strip formed element having a resilient core. In preferred embodiment this core is covered or substantially sheathed in an envelope which is preferably of non-porous flexible material capable of heat transfer, the outer surface of which mounts a pressure or heat sensitive adhesive.

The strip body is characterized in one form by the feature that on application of a predetermined range of heat it will self adapt in form and/or contained volume to the load of contacting parts, in the process of which the adhesive will bond to such parts and the body of the strip will form a seal between the parts in contact, irrespective of irregularities in the contacted surfaces.

An aspect of the invention of considerable importance is the concept of controlled flow so that coupling devices, on deformation thereof under load, will inherently seek the proper direction of flow, self-dispersing in a manner to minimize and avoid surface contamination and effect optimal positioning of adhesive parts.

20 Claims, 8 Drawing Figures

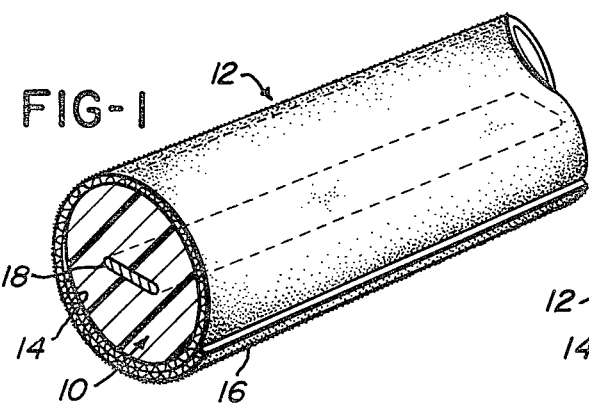
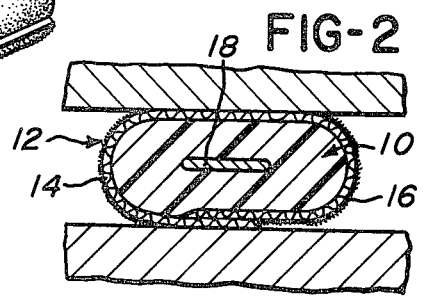
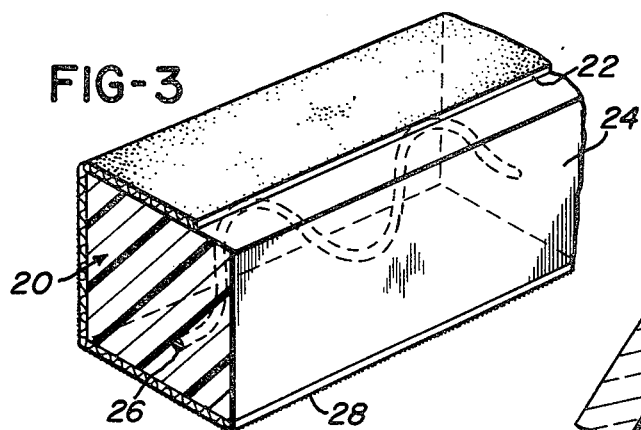
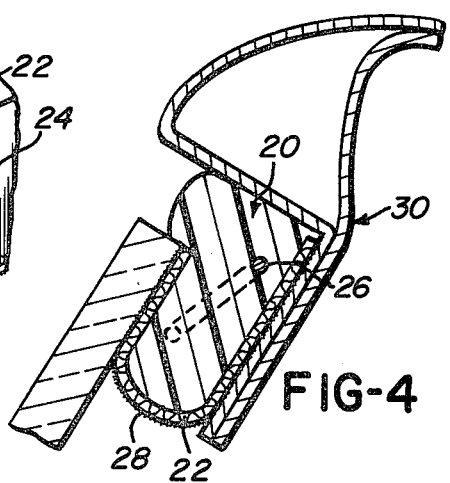
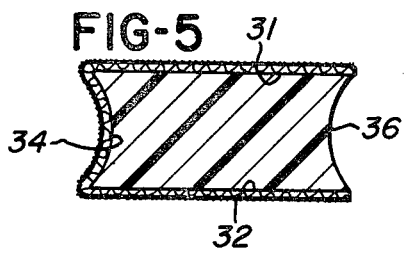
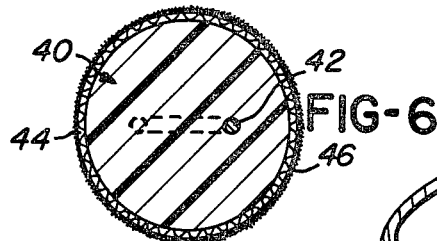
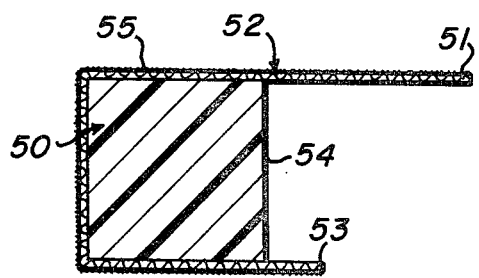
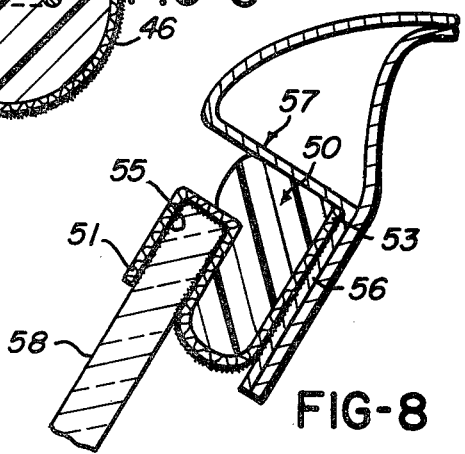

STRIP TYPE COUPLING MEMBER

This is a continuation of application for U.S. patent, Ser. No. 183,448, filed Sept. 24, 1971 now abandoned, for STRIP TYPE COUPLING MEMBER.

BACKGROUND OF THE INVENTION

This invention relates to improvements in strip formed coupling elements having particular advantage for use in coupling and bonding parts which are fabricated of unlike materials.

For example, industries which fabricate products requiring the placement therein of glass or like inserts in frame structures have for many years been plagued with the problems of achieving a simple, inexpensive, initially clean and effective bond and seal between the inserts and their frames. This problem has been particularly pronounced in the automotive industry. Not only have the installations of windshields been less than satisfactory from the standpoint of cost and procedure but the seal provided about the windshield is quite often inadequate, resulting in frequent need for their replacement. The reasons for the difficulties encountered have been of various nature. In many cases the sealant has been difficult to handle and control. This has created flow conditions wherein there has been contamination and damage to surfaces which should not have been contacted by the sealant. The consequences have included non-uniform bonding and considerable expense and time loss in removal of sealant from unwanted areas. In other cases the nature and character of the coupling means has required external pressure to be applied in order to attach a windshield, resulting many times in fracture of the windshield as well as non-uniform coupling conditions. Also, in some cases the procedures require precise positioning of the sealant, incomplete protection is provided for the seal, and extra time and material application may be required after the basic application of the sealant to insure the seal.

With the prevalence of such problems as noted above, there has been proposed a strip-type coupling member for use in bonding a window to a vehicle body. The teaching presented in this respect was the provision of a strip of chloroprene material which would be heat curable to a resilient state by a lengthwise included conductor. See British Pat. No. 1,143,951 in this respect. The strip element contemplated by this patent is quite sticky on its surface and depends for an eventual resiliency on heat curing. Moreover, the nature of the element proposed is such that an application of a part thereto requires an application of pressure to the part, by hammering or other suitable means. This teaching in the prior art has pertinence, as far as being directed to a solution to the above mentioned problems. However, it has not sufficed as a practical answer. The coupling strip proposed neither enables nor provides an original resiliency and does not provide sufficient controls to enable a full and positive seal or adaptability in use and application, so essential to a proper solution of the pertaining problem.

SUMMARY OF THE INVENTION

The present invention provides a simple, inexpensive, and highly desirable solution to the above noted problems. It has particular advantages for use in the automotive industry and in producing thermo-pane type window units and will be so illustrated, though its application is not necessarily so limited.

The invention will be described as applied to the bonding of the periphery of a windshield to a metal frame due to the difficulties particularly inherent in achieving a complete bond and seal between such parts, which have unlike physical properties. Though so described, it is to be understood that the invention concept is equally applicable to the bonding and forming of a seal between parts of like material. Of particular significance is the provision, in preferred embodiments of the invention, of a strip type coupling element characterized by an ability to provide for a controlled flow of a limited portion thereof, enabling both a bond of one part to another and a peripheral and sometimes overlapping seal about said one part as applied to the other.

Preferred invention embodiments commonly feature a core of material which is originally resilient and capable of being plastically deformed but has properties such that it remains stable at elevated temperatures. External to and fully separated from this core is a pressure or heat sensitive adhesive, the latter being applied to one or more layers of an interposed barrier material formed to substantially envelop or sheath the core. Since the core is thoroughly separated from the adhesive, the adhesive can be localized and thereby applied in a controlled area and where required. A further feature of invention embodiments is that the core is formed of material having the capability per se of accommodating and adjusting to the weight of the applied parts and the sheath or barrier is so formed as to accommodate the same. There is enabled thereby a limited and controlled disposition of the core, adapting it to serve the precise needs of a particular application. The barrier or sheath material is so designed, formed or applied to direct the dispersement of portions of the core, as and when required, under load.

A primary object of the invention is to provide an improved coupling element capable of effecting a bond and seal between parts of like or unlike materials which is economical to fabricate, more efficient and satisfactory in use, adaptable to a wide variety of applications and unlikely to malfunction.

Another object of the invention is to provide a coupling element consisting of a resilient core and an external adhesive wherein the same are separated by a barrier material and the core is plastically deformable and remains stable at elevated temperature and the barrier material is formed for a controlled flow of the core material on application of heat and/or the load of an applied part.

A further object of the invention is to provide an adhesive inherently resilient, coupling element which remains stable at elevated temperatures and on application will provide for a directed change of its cross sectional configuration to self-accommodate to an applied load and the configuration of the parts to which it will bond, between which parts it will provide a positive and thorough seal.

Another object of the invention is to provide an adhesive type coupling element which will self-accommodate to the desired spacing between applied parts, irrespective of irregularities in the contacted surface portions of such parts.

An additional object of the invention is to provide an adhesive type coupling element which will self-accommodate to the space desired between applied parts wherein the element includes a resilient core of a nature to maintain stability under the influence of an internally applied heat while accommodating a controlled degree of plastic deformation, which core is separated from an integrated adhesive substance by a barrier material the use of which produces a direct flow of the core material whereby to faciliate the removal or utilization of the flowed core portion.

Another object of the invention is to provide a resilient coupling element comprising a barrier material to encompass at least a portion of a load accommodating plastically deformable stable core and separate the same from applied adhesive, affording thereby means for a directed flow of the core under load and a defined seal between parts in application. In some instances the object is to provide also for an overlapping protective attachment of the barrier material to one of the connected parts.

A further object of the invention is to provide a resilient strip type coupling element possessing the advantageous structural features, the inherent meritorious characteristics and the means and mode of use herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the drawing wherein some but not necessarily the only forms of embodiment of the invention are shown, FIG. 1 is a perspective cross sectional view of a strip type coupling device in accordance with the invention, as originally provided;

FIG. 2 is a cross-sectional view showing the adaptation of the device of FIG. 1 to load in producing a seal and a bond between parts;

FIG. 3 is a cross-sectional view of a further strip type coupling device in accordance with the invention;

FIG. 4 illustrates the manner in which the device of FIG. 3 forms a seal and bond between parts;

FIG. 5 is a cross-sectional view of a modification of the unit illustrated in FIGS. 3 and 4;

FIG. 6 illustrates a further embodiment of the invention featuring a resilient core such as illustrated in the previous figures, which core is fully contained in a tubular sheath the outer surface of which has applied thereto a thin layer of adhesive; and FIGS. 7 and 8 are cross-sectional views showing another improved adhesive coupling element per the invention, first as originally provided and secondly as applied to the connection of a vehicle windshield to its frame.

Like parts are indicated by similar characters of reference throughout the several views.

It will be observed that only so much of the invention structure is here illustrated and described as may be necessary for an understanding thereof by one versed in the art. It will be self-evident that the coupling device of the invention may be produced in an elongate strip form which may be coiled or otherwise suitably packaged preliminary to use in selective lengths to suit the required application or as an individually sized element for predetermined and localized application.

In the composite body form illustrated in FIGS. 1 and 2, the core 10 of the strip type coupling element 12 is formed, for example, of a butyl or ethylene-propylene rubber composition. The composition of either substance will be such to provide a core, in accordance with a preferred embodiment the invention, which is originally resilient but has the property, on reaching a predetermined elevated temperature, in the range of 250° to 500° F., of stability while exhibiting a capability of plastically deforming under the influence of and proportional to the magnitude of an applied load.

A specific example of a preferred core composition which will serve the invention requirements is illustrated by the following:

| CORE COMPOSITION | (by weight) |
|---|---|
| Butyl Rubber | 35% |
| Inert Fillers | 50% |
| Polybutene | 5% |
| Polyisobutylene | 10% |

In the example of FIGS. 1 and 2 the core 10 is enveloped, the length thereof, in a flexible wrapping 14. The latter is formed, for example, of bias woven cloth suitably coated with polyethylene to be rendered non-porous. The wrapping is sheetlike in character and is applied circumferentially of the core in a manner to have its lateral extremities overlapped. Applied selectively to the outer surface of the wrapping 14 is a pressure or heat sensitive adhesive. As will be seen, the wrapping forms a barrier which prevents contact or interaction between the outer adhesive and the contained core.

The adhesives used will depend upon the strip application. For example, pressure sensitive butyl based adhesive may be used where it is intended to apply the strip to a glass bonding area while a hot melt polyethylene based adhesive may be used for application to certain plastics bonding areas. In some instances the application of adhesives may be localized and/or different types of adhesives may be used on different localized portions of the wrapping, their nature being dictated by the physical properties and/or differences in the materials of the parts with which they may be brought into contact. A sample of an adhesive coating which may be used in conjunction with a wrapping for the above described core 10 may be as follows:

| ADHESIVE COATING COMPOSITION | (by weight) |
|---|---|
| Butyl Rubber | 80% |
| Polybutene | 5% |
| Polyisobutylene | 10% |
| Phenolic Resin (Thermo-plastic) | 5% |

Attention is directed to the fact that in this embodiment the nature of the adhesive layer or coating applied to the outer surface of the wrapping will be such that there will be frictional resistance to relative movement of the overlapped wrapping portions, but they will not adhesively bond together.

As mentioned previously, while here illustrated in limited fashion, it should be understood that the embodiments described may have various original body configurations, though preferably fabricated in an elongate strip form which may be coiled on a reel or the like so that suitable lengths may be cut therefrom as and to the extent required for a particular application. From the illustrations and their description, the precise and definitive characteristics of the invention embodiments should be clearly apparent to those versed in the art.

To complete the invention unit of FIGS. 1 and 2 there is embedded in the central portion of the core 10, the length thereof, a wire heating element 18. The element 18 is so designed and placed as to achieve a generally uniform heating of the core, from the interior thereof to its exterior, as connections are made to its respective ends to apply a source of power to induce the passage through the wire of a suitable level of electric current.

In use of the above described strip coupling element, it is seated in a frame, to the specific base portions thereof to which the periphery of a glass windshield may be applied. In conventional practice the size of the frame and the windshield cannot be precisely drawn. Accordingly, there normally is in any case a space contemplated between the periphery of the windshield and the surrounding portions of the frame. In application, the periphery of the windshield will be caused to seat on the outermost strip surface, the overlapped extremity of the strip wrapping being based on the frame and so oriented to be directed outwardly towards the spaced peripherally surrounding frame portions. With application of a source of electricity to the ends of the heating element 18, the core material can be internally heated in a uniform manner and to an elevated temperature in a prescribed range, which as noted will be between 250° and 500° F., whereupon, though remaining stable, the core material is rendered plastically deformable to self-adapt to accommodate the windshield load. The invention provides that at this point the core is reduced in thickness under the influence of and by reason of the weight of the windshield, the overlapped portions of the wrapping frictionally slipping to accommodate the same. This arrangement provides that the core will have a directed spread or flow in a sense laterally outward to bridge and fill the space peripherally of the windshield, between it and surrounding portions of the windshield frame. Thus, the flexible barrier material forming the wrapping will under the influence of the pressure applied by the windshield weight, with the prescribed heating of the core, assist in a controlled distribution of the core and transmit heat to the adhesive material on its outer surface. Since the wrapping is flexible, with the laterally and outwardly directed spreading thereof influenced by the forming action of the core, the strip exterior will be forced into contact with and conform to surface configurations of contacted parts, filling any irregularities. This insures the adhesive will fully and securely bond to such parts.

There is thus provided a strip type coupling device of a simple and economical nature which can be quickly and easily applied to achieve a full bond and seal with contacted parts. Moreover, the strip design is such that there is an inhibition of any contamination of parts where the same is not desired. There is a controlled flow of the core and inherent self-positioning of the strip body and its contents which is dictated by the nature and character of the part which is seated and bonded to the frame. The advantages in saving of time and labor in application and normally anticipated cleanup are believed self-evident. Not only is the use of the barrier material as here described certain to enable a wide range of core and adhesive composition without fear of their interaction but, by utilizing a suitable wrapping or barrier material having electrical insulating properties, it is possible to position the heating wire element in any desired position within the core without risk of short circuiting the unit when one of the parts to be coupled is bare metal. Barrier or wrapping materials may be, for example, cured Butyl rubber sheeting, cotton, nylon and like cloths, plastic films and aluminum foil. Of course, where aluminum foil or other metallic wrapping is utilized, it is desirable that the wire or other conductive element used for heating be itself insulated. Further, if aluminum or like foil is to be used, it is desirable that the same be creped so as to render it adaptable and flexible to accommodate the needs of a particular situation wherein there is to be an uneven final surface of the wrapping when the adhesive bond is achieved between parts. Take note that in the embodiment illustrated in FIGS. 1 and 2, there need be no lateral outflow of core material.

A further embodiment of the invention is illustrated in FIGS. 3 and 4 of the drawings. Here we have a core 20 formed of a material such as above described in reference to the core 10 but in an elongate strip form which is generally rectangular in cross section. As seen, the core 20 has wrapped thereon a sheath-type layer 22 of barrier material which does not quite extend the full circumference of the core. Here the lateral extremities of the wrapping are spaced to actually provide an exposure of core material at a location 24 which extends the length of the strip and to one side and a portion of the top thereof. Further, embedded in the core 20, the length thereof, is in this case a sine wave formed wire heating element 26. As shown, the element 26 is positioned on a diagonal of the core so that upon heating in a manner similar to that previously described there is a substantially uniform dissipation of heat at each of several substrates of the core. A thin layer 28 of an adhesive material of the nature previously described is suitably applied to the exterior of the sheath 22 to complete the basic requirements of an invention embodiment in this instance. Here, the sheath material may be creped aluminum foil, for example, and the element 26 coated with an insulating medium.

In use of this second described rectangular embodiment of the invention, one avoids need for concern in respect to incidence of peel stress which plagues industry and conventional practice. As seen in FIG. 4, the strip in this instance is applied to the base of a frame 30 rimming the opening for a windshield and so as to extend originally substantially to the peripherally surrounding wall portion of the frame. In seating the windshield to the frame the outer peripheral edge portion of the windshield will seat at its bottom to the abbreviated sheath portion 22 which disposes uppermost and to the inner periphery of the frame, short of the exposed core portion 20. As heat is applied to the core material in the aforementioned range of temperature through the conducting of a current flow through the wire element 26, the core body, which may be of a material such as previously described, will function as previously described. It will self adjust to the weight of the applied windshield from which it is separated by the barrier material 22. The opening 24 of the sheath provides for a directed flow of the core material laterally outward to fill the area between the outer periphery of the windshield and the surrounding wall of the frame. The volume of the strip in the first instance, that is of the core material utilized, will be such that in the process of the reduction of the thickness of the strip in the areas between the windshield and the base of the frame, as predeterminable by the weight and shape of the windshield, there will be extruded sufficient of the core to form a peripheral seal about the windshield. The adhesive together with the sheath material under the influence of the adapting pressured core is caused to fill any irregularities in the contacted surfaces of the windshield and the base of the frame and to adhesively attach, either under the influence of pressure or heat, depending on the nature of the adhesive, and achieve a bond in place without further treatment.

Particular attention must be directed to the limitations as to the nature and character of the core composition in the preferred embodiments of a strip-type coupling device such as herein described. The requirements expressed in reference to preferred embodiments specify a core which is both resilient and stable. As stated, the composition of the core is such that the stability thereof is maintained even while it accommodates plastic deformation, under the influence of an applied load and under conditions wherein its temperature is raised to a level in the range of 250° to 500° F. The import of these factors must be clearly understood. For example, the original resiliency of the core composition inherently provides a strip coupling member having shock absorbing capabilities. As the part constituting the load member is seated over the strip-type coupling member, the embodiment of a resilient core in the latter insures against inadvertent damage to the applied part. At the same time, no plastic deformation of the core, and thereby no permanent change in body configuration of the strip-type coupling member of which it forms a part, can take place until the part applied in superposed relation to the coupling member is properly set, and even then not until the temperature of the core is raised to that highly elevated temperature, in the range of 250° to 500° F., at which the core temporarily loses its resiliency and becomes plastically deformable, while remaining stable. The import of the factor of stability, as recognized by those versed in the art with which we are here concerned, is that the body of the core will exhibit substantially no chemical or molecular change under the specified conditions. An inherent result in the use of a core of this nature is that it will not unrestrictedly break down and flow under the application of heat but merely lose its plastic memory on a temporary basis. As previously set forth, it is the stability of the core together with the provision of a sheath of the nature prescribed that dictates the controlled adjustment of the configuration of the core, in directions prescribed by the nature and character of the sheath, sufficient only to accommodate, in the example illustrated, the weight of an applied window or windshield. This stability insures that no more of the core will be displaced in a plastic deformation thereof under the influence of an applied part than is prescribed by the weight and/or configuration of the superposed part. This means that with the controlled plastic deformation of the core there still remains a full and proper backing of the windshield by a substantial portion of the core while the remainder thereof which is caused to be displaced in a controlled direction moves to insure a positive seal between the applied part and the base which underlies the coupling member which embodies this core. The foregoing should leave no doubt in the mind of those versed in the art as to the inherent parameters of those embodiments of the invention which utilize a preferred core composition of the type hereinbefore specified.

Attention is directed to FIG. 5 where there is a cross-sectional configuration provided for the strip usable particularly where there is need for particular concern as to peel stress. As seen, in this embodiment the upper and lower surfaces 31 and 32 of the strip unit are flat and substantially parallel while the sides 34 and 36 are concave formed. In this case, upon compression and directed flow, the concave portions will provide for a directed spread in the process of which there is insured an optimal broad surface attachment.

As noted above, the rectangular cross section of the strip has particular advantages for certain applications and the utilization of an exposed portion of the core to provide for directed flow to accommodate compression may achieve highly suitable benefits. Benefits would obtain, for example, where it is important to keep the adhesive surface portions of the strip from bonding to third elements. As a matter of fact, it may be desired for such applications that the sheath be a loosely woven fabric saturated with a Butyl rubber or the like. In any case, the embodiment such as illustrated in FIGS. 3 to 5 may be used for flow control wherein the core contributes to a seal without contamination or damage to parts clear of the areas where adhesive attachment is effected.

At this point it should be understood that the barrier material may be porous in certain instances, such as where there is no concern for a chemical interaction between the core material and the external adhesive material since they are compatible.

In any case, it is to be understood that the invention embodiments provide a controlled directional movement of core materials so as to leave a desired amount of core material between the parts to be bonded together without need for other than a self-adapting of the core under the influence of applied load and/or heat depending on the core composition.

FIG. 6 will illustrate yet a further mode of embodiment of the invention. Here the strip body is illustrated to include a core 40 having embedded centrally thereof a coextensive thermal element 42, the total being fully enclosed in a tubular sheath 44. The latter mounts, externally thereof, a pressure or heat sensitive adhesive 46. In this case we have a membrane-type barrier which fully contains the core, requiring that the barrier material have sufficient elasticity to accommodate a reshaping of the core under the influence of an applied load. Any one of a number of materials, such as polyethylene, polypropylene, nylon, vinyl, ABS, and various rubbers may be utilized to provide the sheath 44. For maximum control of flow direction, the sheath could have a non-uniform wall, the thinner wall portion dictating the direction of cross sectional adjustment of the strip body under load and under the conditions previously described. This last described embodiment will be desired where it is important to prevent outflow of the plastically deforming core material if heat is applied to a critical temperature. Not only does the sheath or membrane 44 prevent contact between the adhesive exterior material and the core material but the membrane can here serve to keep the core heating element from "melting out" of the tape body in those applications which require prolonged heating of the core to raise the surface temperatures of the bonded elements to a level to allow wetting by the adhesive surface of the strip. This would be the case, for example, in an application for producing an in-place thermal window when the outside temperature conditions are relatively low. It would be important also when it is necessary to prolong the heat cycle to effect the cure of the adhesive surface on the outer side of the membrane. Of course, this latter would be dictated by the nature of the adhesive employed. The adhesive could be such as butyl, neoprene and natural rubbers, polyesters, epoxies and polysulfides.

Since the nature and character of the procedure for placement and attachment of the strip unit to form a bond between parts has been amply described above, such detail will not be repeated here. Suffice it to say, the applications may be made in a similar manner and under similar conditions. One further point is that by having the fully sheathing membrane, this would allow use for this sheathing of thermo-plastic materials with very critical flow temperature such as polyethylenes, polyamides, asphaltic compounds and even waxes which have a degree of resiliency, that is those materials which are changed from a solid to fluid state by a few degrees change in temperature in the critical range. In any case, the unit self adapts to meet the needs of the situation, controlling the bond thickness and character and affording a full and satisfactory seal without contamination of related parts.

It is of course possible to utilize open ends on a tubular strip to provide for the outflow of melted core material at these points and in localized areas where they might be quickly removed with minimal effort. As a matter of fact, while not preferred, with the last described strip unit one could use compounds such as hot melt adhesives as core material.

It will be self-evident that the adhesives used may be selected from a wide range of materials and depend upon the application. Also, for example, in the illustration of FIGS. 3 and 4, opposite surface portions of the sheath may have different adhesives applied to accommodate needs of different materials of the parts with which they are brought into contact.

There is a further embodiment of the invention that deserves specific attention. This would be in the case where the membrane or barrier material would be selected to be of such a nature it would melt or dissipate on application of a critical temperature in the specified range whereby to allow a chemical union of the core material and the external adhesive. This aspect of the invention would be utilized where the nature of the core and of the adhesive would be such that an interaction therebetween would be essential to enable a complete bond or a chemically cured bond between the adhesive, the core and the contacted parts. Of course, where there is a directed opening such as in the case of the example of FIGS. 3 and 4 and 5, there will be a directed flow of a portion of a core distinguishable from that covered by the barrier layer and the superposed adhesive material. An example where an embodiment such as this last described might be desirable would be where there is an absolute necessity for a continuing hermetic seal between parts with no room for risk. In such case the core could be an epoxy separated from an external curing agent such as Mercaptan by a barrier material such as vinyl.

FIGS. 7 and 8 reveal yet a further and most basic application of the invention concepts, the embodiment being versatile in that it may be used with or without the presence of heat. FIG. 7 shows a core 50 of resilient load accommodating material which is non-adhesive in character. This material may be selected from any one of a family of stable materials such as previously described but may be so composed as to cold flow under load. An example of such composition is as follows:

| Butyl Rubber | 40% by wt. |
| Inert Fillers | 40% by wt. |
| Polybutene | 10% by wt. |
| Polyisobutylene | 10% by wt. |

On the basis described the core 50 does not require the internal heating element characteristic of certain previously described embodiments of the invention. Moreover, the core 50 is shown in the preferred rectangular cross section the advantages which have been described with reference to the embodiment of FIGS. 3 and 4.

As shown, the coupling element is originally provided to have a layer 52 of non-porous barrier material of the type previously described wrapped on its top, inner and bottom sides so as to have its lateral extremities 51 and 53 project relatively free of the core at its top and bottom sides. Note that this leaves the one outer side 54 of the core relatively exposed and that the projection in respect thereto of the upper extremity 51 is substantially greater than the projection of the lowermost extremity 53. Further, the outer surface of the barrier 52 is coated with a layer of suitable adhesive 55 in correspondence with the nature of the surface to which the same is to abut.

In application of fixing the windshield, the device of FIG. 7 may be applied to a windshield frame to have the bottom including the projected extremity 53 of the barrier material which is adhesively coated seat to the base 56 of a recessed frame portion 57 for a windshield so the exposed outer side 54 of the core 50 will face the recessed wall and the extremity 53 will approach the same. As a windshield 58 is placed on the upper portion of the coupling member, its outer periphery will in normal practice be spaced from the recessed wall. As the core 50 is loaded, the core being of such a nature, will plastically deform and have a directed flow at its exposed side 54 to the peripherally surrounding recess wall, moving over the free lateral extremity 53 of the barrier material. Thus, the core will self adapt in a predetermined fashion to the load and fill the space outwardly of the windshield to the degree determined by the initial volume of the core while a firm bond is created by the weight of the windshield per se between the frame and the barrier material and between the windshield and the barrier material through the medium of the adhesive. As this occurs, the projected extremity 51 of the barrier material which is adhesively coated at its outermost surface may be folded up, over and back on the peripheral edge of the windshield for added protection thereof and to prevent damage thereto if a molding is to be applied which might abut the upper peripheral surface of the windshield.

Of course, compatible material will be utilized as between the barrier material and the core on the three sides to which the core is applied in creating the original coupling device.

The advantages of this last described embodiment of the invention should be self-evident and it highlights the versatility of use of the concept of the present invention whereby a substantial variety of resilient materials may be used as a core in conjunction with a barrier material which isolates, from the core, adhesive to facilitate a controlled adhesive connection between the coupling device and the parts to which the same may be applied. Of utmost importance is the principle of applying the barrier so as to leave the core to be directed or influenced to flow in a particular direction when load is applied in use. Of course various other modifications of the invention have been illustrated, each bearing importance to a particular area of industry and usage. The controlled direction concept, as has been made self-evident, can be applied also where in some instances the core is desired to be of adhesive material and have a directed flow to a particular area where adhesive is desired.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or privilege is claimed are defined as follows:

1. A coupling device comprising a core formed of resilient material the composition of which is such to condition said core to plastically deform in response to and to the extent of an applied load when said core is at a temperature in a range from about 250° to 500° F., the composition of said core being characterized by stability when the temperature thereof is within said range, means defining a sheath for at least a portion of said core, adhesive bonding material on the exterior surface portion of said sheath, and said sheath being constructed and applied in a form to provide a directed and controlled shift of a portion of said core when the core is subjected to a load on placement of said coupling device between surfaces of parts to be bonded and caused to reach a temperature in said predetermined range, whereby to produce a controlled change in the core configuration and a bond and seal between said parts.

2. A coupling device as in claim 1 wherein said body has a strip-like form and said sheath means is made of an impermeable material.

3. A coupling device as in claim 1 wherein said sheath means is formed to be non-continuous as to its coverage of said core and to expose a predetermined surface area of said core.

4. A coupling device as in claim 1 wherein said sheath means is a flexible wrapping and said bonding material is applied to at least localized surface portions of said wrapping.

5. A coupling device as in claim 4 wherein said wrapping is sheet-like in character and applied circumferentially of said core in a manner to have lateral extremities thereof overlapped and to shift, one relative the other, to accommodate the shift of a portion of said core during the plastic deformation thereof under the influence of an applied load.

6. A coupling device as in claim 1 wherein said core is a strip-like element and said sheath means is applied circumferentially of said core, the length thereof, to have its lateral extremities, in a circumferential sense, circumferentially spaced whereby to provide an opening in said sheath for a directed shift of a portion of said core when the same is plastically deformed under the influence of an applied load, and to the extent thereof.

7. A coupling device as in claim 1 wherein said core is formed to have a generally rectangular cross section and said sheath means envelopes substantially three sides of the core leaving one side portion thereof exposed to provide thereby for a directed shift of a portion of said core when the same is plastically deformed.

8. A coupling device as in claim 7 wherein said exposed side portion of said core has a generally concave configuration.

9. A coupling device as in claim 1 wherein said sheath means in applied in a sense circumferentially of said core to leave an elongate section of the surface of said core exposed whereby on plastic deformation of said core under an applied load on the reaching thereof of a temperature in said predetermined range a portion of the core is inherently displaced in the area of the exposed portion thereof and said sheath means includes a free extension adapted in application of a coupling device to be reversely overlapped on a portion of the parts intermediate of which said coupling device is positioned.

10. A coupling device as in claim 9 wherein said core has a generally rectangular cross section, said sheath means envelopes substantially three side surface portions of said core and leaves one side surface portion thereof uncovered whereby to define an elongate opening in said sheath and one edge portion of said sheath means projects substantially beyond said opening and defines said free extension.

11. A coupling device according to claim 1, wherein said core is compounded of Butyl rubber in an amount on the order of 35%, Polybutene in an amount on the order of 5% and Polyisobutylene in an amount on the order of 10%, with the balance inert fillers.

12. A coupling device according to claim 1, wherein said core is compounded of Butyl rubber in an amount on the order of 40%, Polybutene in an amount on the order of 10% and Polyisobutylene in an amount on the order of 10%, with the balance inert fillers.

13. A coupling device according to claim 1, wherein said bonding material is an adhesive coating coextensive with the outer surface of said sheath means.

14. A coupling device according to claim 13, wherein said adhesive coating is compounded in major part of Butyl rubber and in lesser part of Polybutene, Polyisobutylene and a thermoplastic material.

15. A coupling device according to claim 1 wherein said core incorporates means for applying heat to raise the temperature of said core and said sheath means is made of heat conductive material for ready transfer of heat to said bonding material.

16. A coupling device according to claim 15 wherein said sheath means is fabricated of a metallic foil.

17. A coupling device as in claim 1 wherein said sheath means fully envelopes said core and has a non-uniform wall thickness with the thinner portion thereof dictating the direction of shift of a portion of said core when subjected to plastic deformation under the influence of an applied load.

18. A coupling device as in claim 1 wherein said core has an elongate strip form, said sheath means is applied in a sense circumferentially of said core and the ends of said core are exposed.

19. A coupling device as in claim 1 wherein said sheath means is adapted to dissipate on being subjected to a temperature in said predetermined range to provide for a chemical union of a core and said bonding material.

20. A coupling device as in claim 1 wherein said core is adhesive in character.

* * * * *

UNITED STATES PATENT AND TRADEMARK OFFICE
CERTIFICATE OF CORRECTION

PATENT NO. : 4,115,609

DATED : September 19, 1978

INVENTOR(S) : Stephen A. Denman

It is certified that error appears in the above-identified patent and that said Letters Patent are hereby corrected as shown below:

Col. 10, line 35, a comma is to be inserted following "core" (second occurrence)

Col. 12, line 11, (Cl. 9, line 2) "in" (first occurrence) is corrected to read -- is --.

Signed and Sealed this

Sixth Day of February 1979

[SEAL]

Attest:

RUTH C. MASON
*Attesting Officer*

DONALD W. BANNER
*Commissioner of Patents and Trademarks*